US012723641B1

(12) United States Patent
Hsu et al.

(10) Patent No.: US 12,723,641 B1
(45) Date of Patent: Sep. 1, 2026

(54) WORM GEAR LINEAR DRIVE STRUCTURE

(71) Applicant: FOSITEK CORPORATION, New Taipei City (TW)

(72) Inventors: An-Szu Hsu, New Taipei City (TW); Yung-Chih Tseng, New Taipei City (TW); Po-Yun Chen, New Taipei City (TW); Zoen Ryon Ryan Wong, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/266,611

(22) Filed: Jul. 11, 2025

(30) Foreign Application Priority Data

Jun. 6, 2025 (TW) ................................ 114121335

(51) Int. Cl.
*F16H 19/02* (2006.01)
*F16H 25/20* (2006.01)
*F16H 25/24* (2006.01)

(52) U.S. Cl.
CPC ....... *F16H 19/025* (2013.01); *F16H 25/2009* (2013.01); *F16H 25/2409* (2013.01)

(58) Field of Classification Search
CPC .... F16H 19/025; F16H 25/2409; F16H 25/20; F16H 55/32; F16H 25/2009; F16H 1/34
See application file for complete search history.

(56) References Cited

U.S. PATENT DOCUMENTS 4,685,345 A * 8/1987 Gruss .................. F16H 25/2252 74/25
4,878,400 A * 11/1989 Kimura ................... F16H 48/29 475/227
7,651,436 B2 * 1/2010 Sugitani .................. F16C 19/50 475/341

(Continued)

FOREIGN PATENT DOCUMENTS

CN 212056041 U 12/2020
CN 110332293 B * 3/2023 ......... F16H 55/0886

(Continued)

OTHER PUBLICATIONS

Search Report dated Feb. 6, 2026 issued by Taiwan Intellectual Property Office for counterpart application No. 114121335.

*Primary Examiner* — Bobby Rushing, Jr.
(74) *Attorney, Agent, or Firm* — Demian K. Jackson; Jackson IPG PLLC

(57) ABSTRACT

A worm gear linear drive structure includes an internal helical gear member having an inner bore with a helical gear structure and a rod extending through the bore along an axial direction. A plurality of worm gear assemblies are disposed within the bore between the internal helical gear member and the rod. Each worm gear assembly includes at least one worm gear with a gear structure on its outer circumferential surface, the gear structure being in cross-axis meshing engagement with the helical gear structure, and the worm gear being in frictional contact with the outer circumferential surface of the rod. A preload assembly is disposed (Continued)

radially outward of the worm gear assemblies and applies a preload force to the worm gear assemblies, generating static frictional force between the worm gears and the rod to enable axial linear movement of the rod when the internal helical gear member is rotated.

8 Claims, 8 Drawing Sheets

(56) References Cited

U.S. PATENT DOCUMENTS

| | | | | |
|---|---|---|---|---|
| 9,973,057 | B2 * | 5/2018 | Sinn | F16H 19/025 |
| 2002/0006846 | A1 * | 1/2002 | Gallo | E05F 11/405 475/333 |

FOREIGN PATENT DOCUMENTS

| | | | | |
|---|---|---|---|---|
| EP | 0338643 | A1 * | 10/1989 | F16H 19/025 |
| TW | 201030255 | A | 8/2010 | |
| TW | M676133 | U | 10/2025 | |
| WO | WO-2019025781 | A1 * | 2/2019 | F16H 19/025 |

* cited by examiner

B-B

A-A

WORM GEAR LINEAR DRIVE STRUCTURE

This application claims the priority benefit of Taiwan patent application number 114121335 filed on Jun. 6, 2025, the disclosure of which is hereby incorporated by reference in its entirety.

FIELD OF THE INVENTION

The present invention relates to a driving structure, and more particularly, to a worm gear linear drive structure that combines a worm gear and an internal helical gear structure to achieve conversion between rotational driving and linear movement.

BACKGROUND OF THE INVENTION

Conventional linear drive devices, such as screw and nut mechanisms, have been widely used in industrial automation, precision machinery, and robotics. However, such structures still have technical limitations in terms of reverse drive capability, overload protection performance, and flexibility in stroke design.

For example, when a screw mechanism is subjected to a reverse external force, it is constrained by the helix angle and frictional force, and if the external force exceeds the load limit, it may easily cause thread damage, structural failure, or reverse loading on the motor. Additionally, the internal thread of the nut is difficult and costly to manufacture, which adversely affects the design flexibility of the stroke length.

Some linear drive devices adopt friction wheel structures. However, such designs are often simplified and generally lack adequate friction adjustment and control mechanisms, resulting in transmission failures or poor positioning under normal driving or high-load conditions due to insufficient frictional force. Furthermore, they do not provide effective overload protection, making it difficult to cope with overload conditions caused by reverse external forces.

In view of the above, there is an urgent need for a novel linear drive structure that can effectively address these issues while providing reverse overload protection, stroke design flexibility, and manufacturing efficiency to meet the reliability, flexibility, and diverse application requirements of modern equipment.

SUMMARY OF THE INVENTION

To address the above issues, the present invention provides a worm gear linear drive structure, which includes: an internal helical gear member, a rod, a plurality of worm gear assemblies, and a preload assembly.

The internal helical gear member has an inner bore extending along an axial direction, and an inner circumferential surface of the inner bore is provided with a helical gear structure. The rod extends through the inner bore along the axial direction. The plurality of worm gear assemblies are disposed within the inner bore and positioned between the internal helical gear member and the rod. Each worm gear assembly includes at least one worm gear having a gear structure on its outer circumferential surface, the gear structure being in cross-axis meshing engagement with the helical gear structure. The preload assembly is disposed radially outward of the plurality of worm gear assemblies and is configured to apply a preload force to the worm gear assemblies, thereby establishing a controllable static frictional force between the worm gears and the rod.

When the internal helical gear member is driven to rotate, its helical gear structure engages in cross-axis meshing engagement with the gear structure of the worm gears to synchronously drive the worm gears to rotate. Through the frictional contact between the worm gears and the outer circumferential surface of the rod, the rotational torque is converted into axial linear movement of the rod. Additionally, if the rod is subjected to a reverse external force that exceeds the static frictional force set by the preload assembly, the rod will slip relative to the worm gears, thereby blocking the transmission of excessive reaction forces and preventing damage to the worm gears, the internal helical gear member, or other drive components due to overload, thereby enhancing the durability and operational safety of the overall drive structure.

DETAILED DESCRIPTION OF THE PREFERRED EMBODIMENTS

Figure 1A:
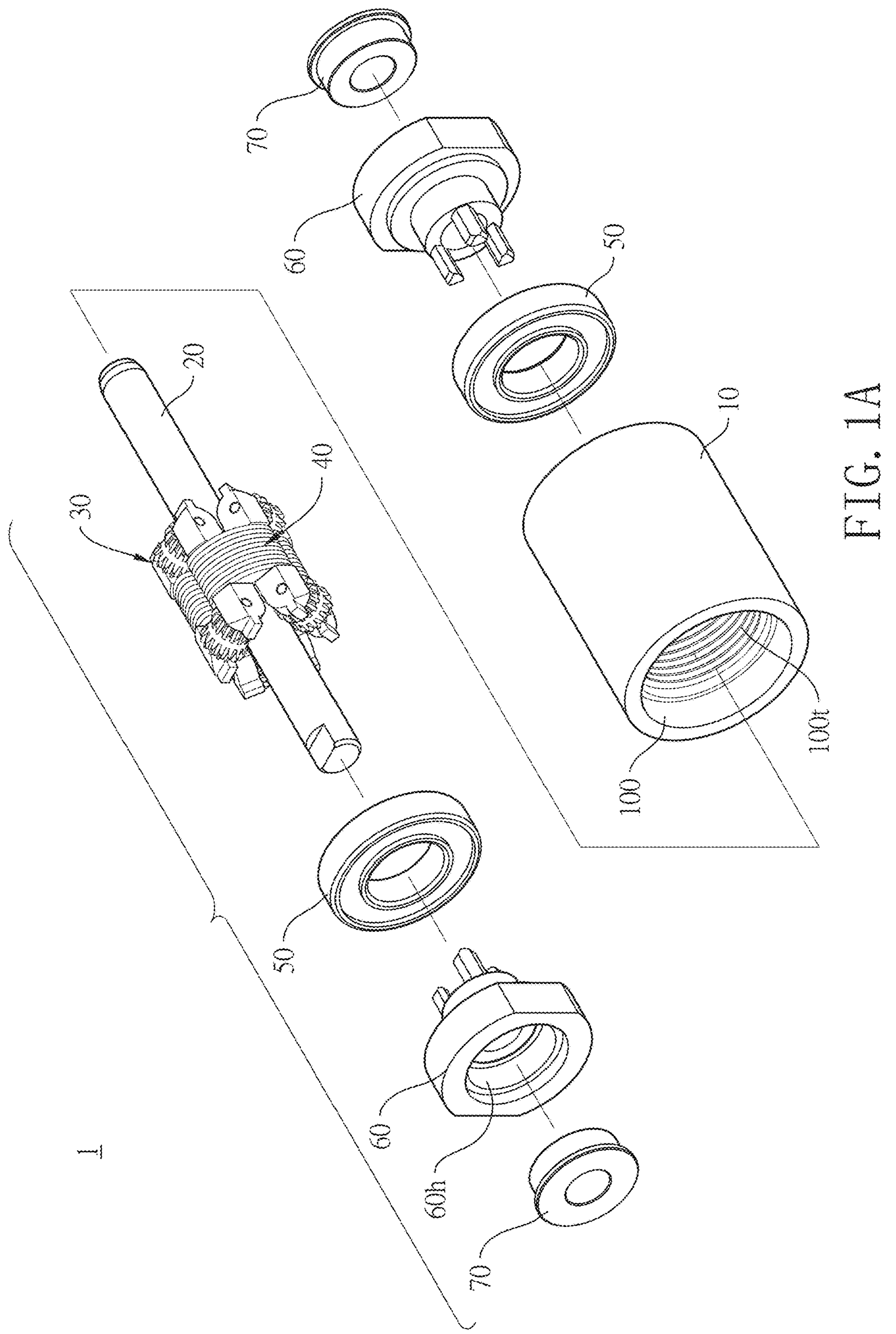
FIG. 1A is an exploded view illustrating the main components of the worm gear linear drive structure according to an embodiment of the present invention.

The structural and functional features of the worm gear linear drive structure proposed by the present invention will be described below with reference to the accompanying drawings of the preferred embodiment.

Referring to FIGS. 1A, 1B, 2A, and 2B, the worm gear linear drive structure 1 of the embodiment of the present invention includes: an internal helical gear member 10, a rod 20, a plurality of worm gear assemblies 30, and a preload assembly 40. The structures and arrangement relationships of these components will be described in sequence below.

Figure 2A:
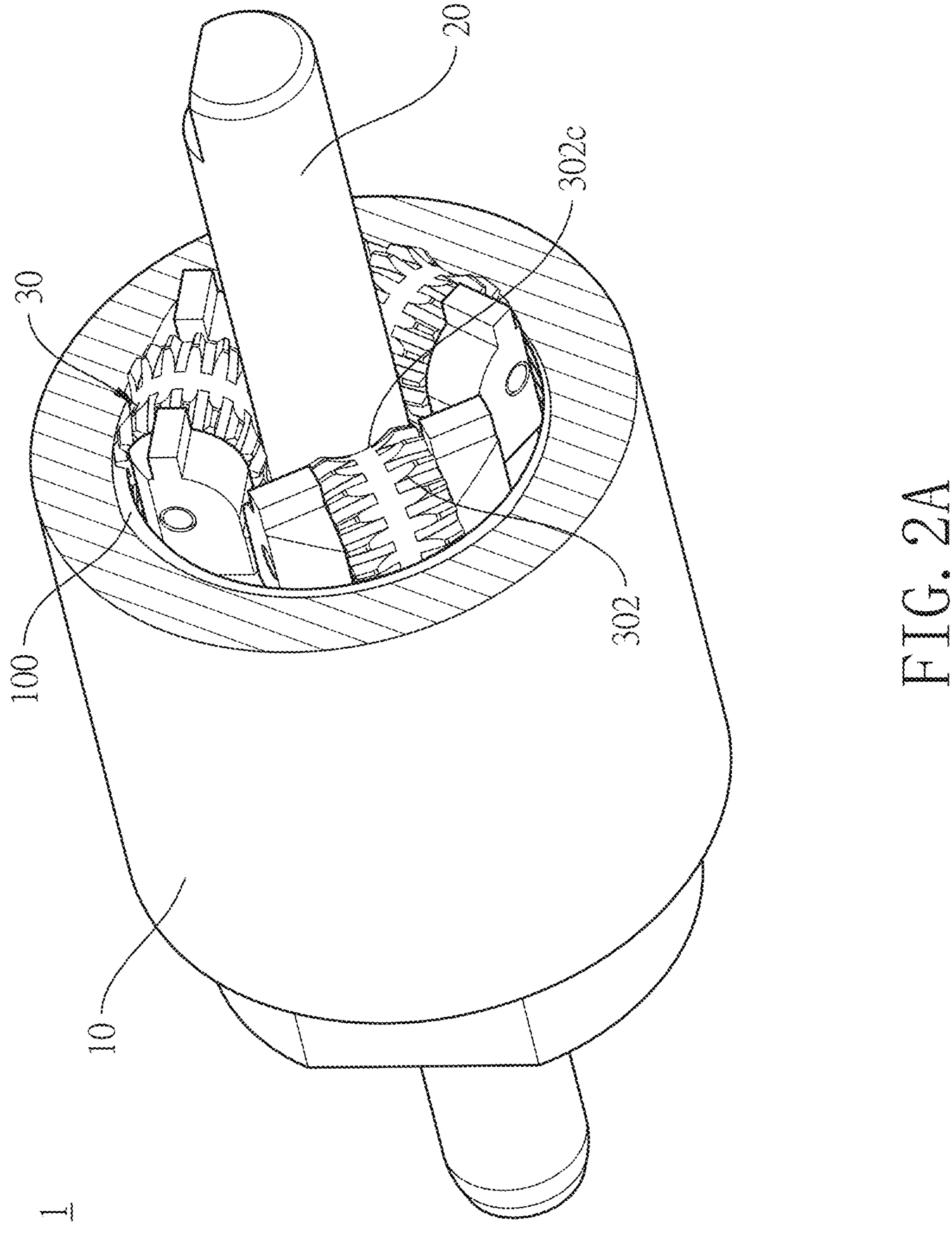
FIG. 2A is a sectional view illustrating the worm gear linear drive structure in an assembled state according to an embodiment of the present invention.
Figure 2B:
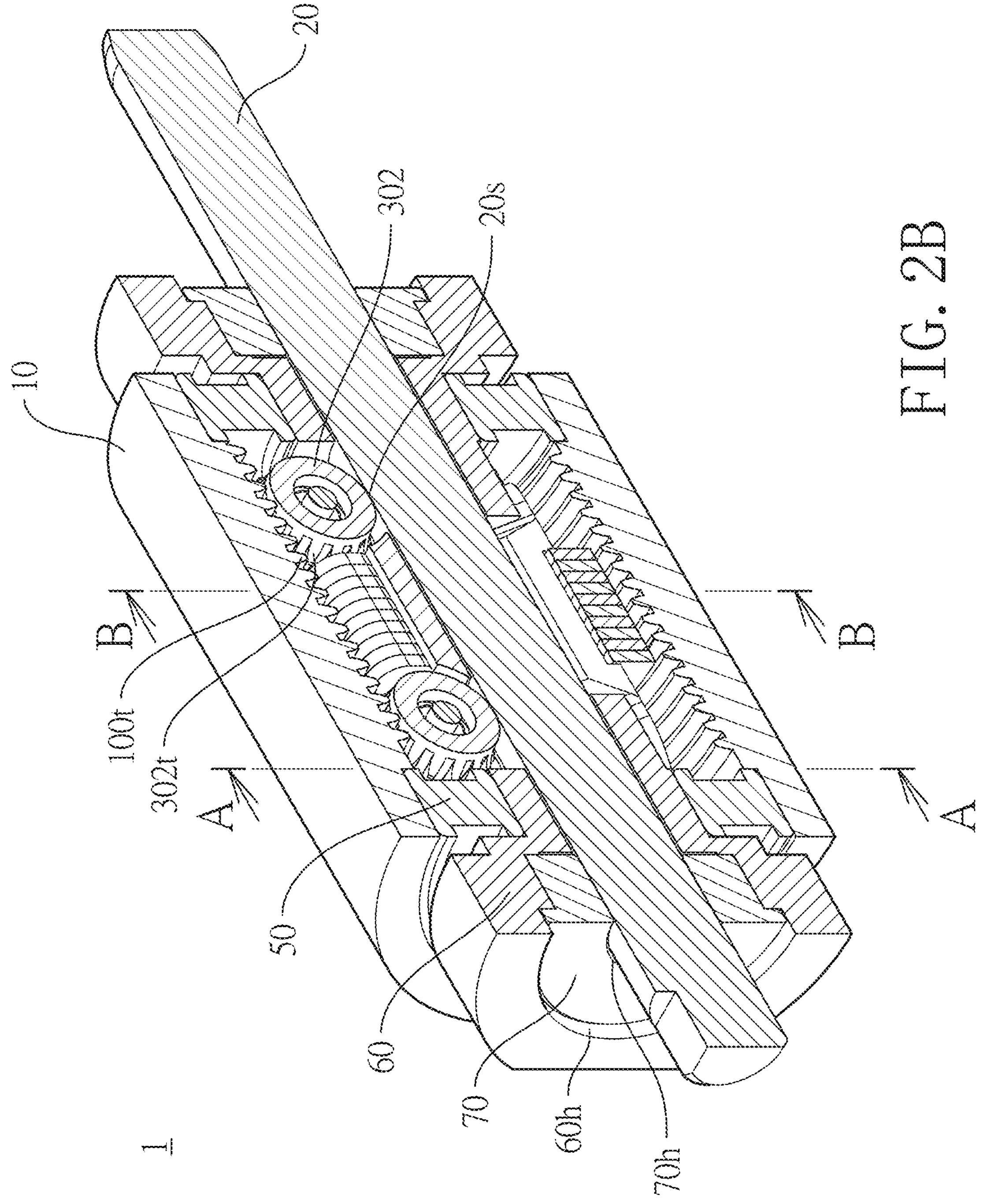
FIG. 2B is a structural sectional view illustrating the worm gear linear drive structure according to an embodiment of the present invention.

As shown in FIGS. 1A, 2A, and 2B, the internal helical gear member 10 has a tubular (hollow cylindrical) structure and defines an inner bore 100 extending along an axial direction. An inner circumferential surface of the internal helical gear member 10 is provided with a helical gear structure **100*t***.

The rod 20 is disposed through the inner bore 100 of the internal helical gear member 10 and extends along the axial direction. The rod 20 may have a circular, elliptical, polygonal, or other geometric cross-section according to design requirements.

As shown in FIG. 2B, at least a portion of the outer circumferential surface of the rod 20 is formed with a smooth surface 20*s*.

As shown in FIGS. 2A and 2B, the plurality of worm gear assemblies 30 are disposed within the inner bore 100 of the internal helical gear member 10 and are positioned between the internal helical gear member 10 and the rod 20.

Figure 1B:
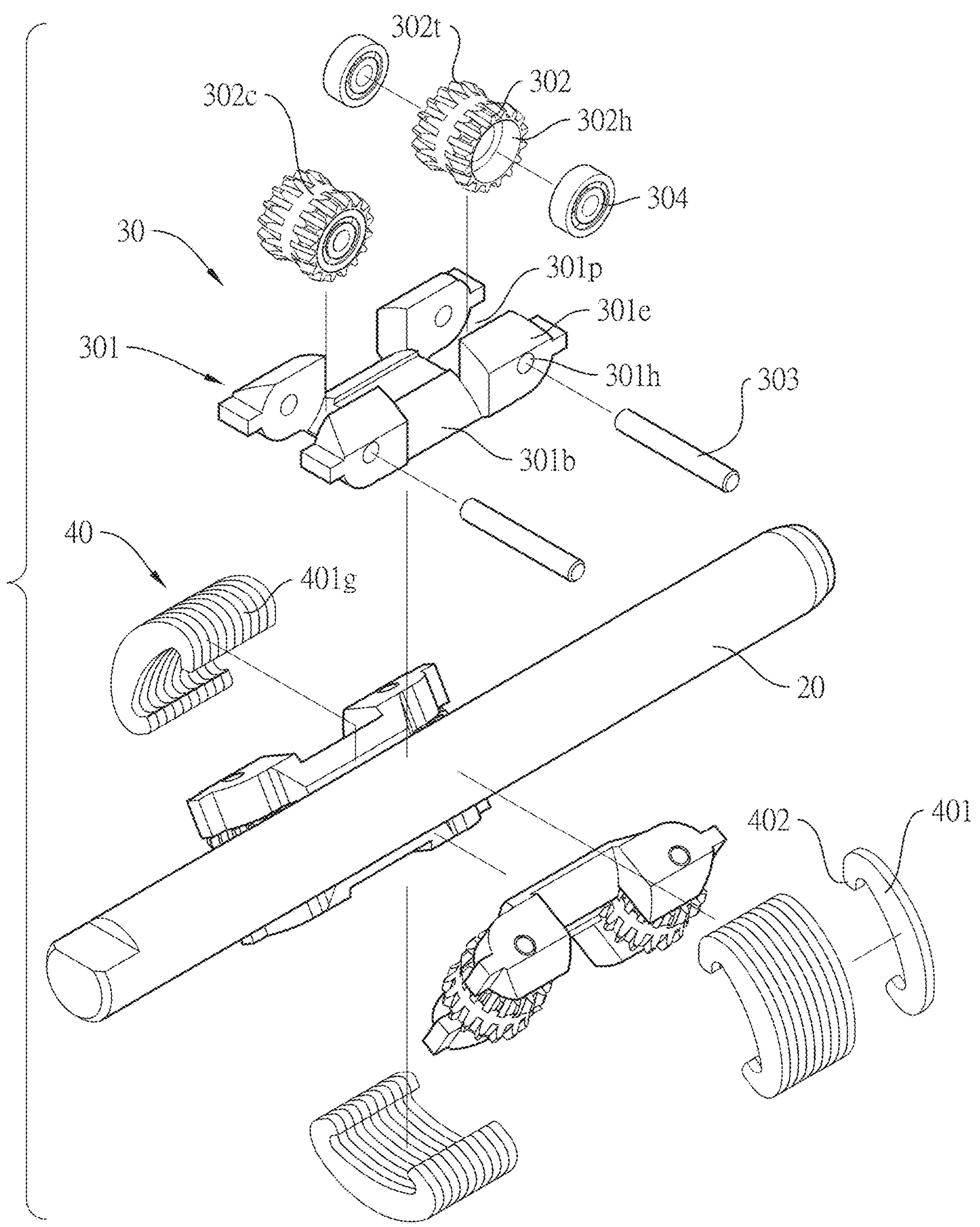
FIG. 1B is an exploded view illustrating the worm gear assemblies and the preload assembly of the worm gear linear drive structure according to an embodiment of the present invention.

As shown in FIG. 1B, each of the worm gear assemblies 30 includes a holder 301, at least one worm gear 302, at least one worm gear shaft 303, and at least two worm gear bearings 304. In this embodiment, three worm gear assemblies 30 are provided, with each worm gear assembly 30 including two worm gears 302, two worm gear shafts 303, and four worm gear bearings 304, as an example for description.

The holder 301 has a body 301*b* and two pairs of end portions 301*e* extending from two sides of the body 301*b*. Each of the end portions 301*e* is provided with a through hole 301*h*, and a spacing 301*p* is defined between each pair of the end portions 301*e*. The two worm gears 302 are respectively disposed within the spacings 301*p* between the two pairs of opposing end portions 301*e*.

As shown in FIG. 1B, each worm gear 302 has a tubular shape and a gear structure 302*t* formed on an outer circumferential surface thereof.

As shown in FIGS. 1B and 2A, the outer circumferential surface of each worm gear 302 is further formed with a recessed profile 302*c*, and a shape of the recessed profile 302*c* corresponds to an outer circumferential profile of the rod 20, thereby allowing close contact with the rod 20. In this embodiment, the gear structure 302*t* of each worm gear 302 is composed of two rows of gear teeth arranged at intervals along the circumferential direction, and the recessed profile 302*c* is formed between the two rows of gear teeth.

As shown in FIG. 1B, the worm gear bearings 304 are disposed within an inner bore 302*h* of the worm gear 302, while the worm gear shaft 303 is sequentially disposed through the through holes 301*h* of the holder, the worm gear bearings 304, and the interior of the worm gear 302. Through the combination of the worm gear shaft 303 and the worm gear bearings 304, each worm gear 302 can be stably supported and positioned to ensure stable rotation during operation.

Figure 3A:
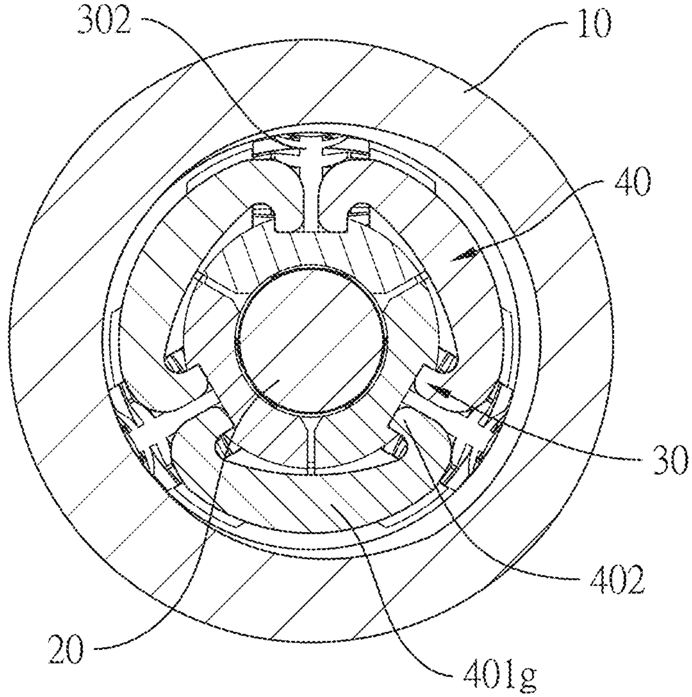
FIG. 3A is a sectional view taken along line B-B of FIG. 2B.
Figure 3B:
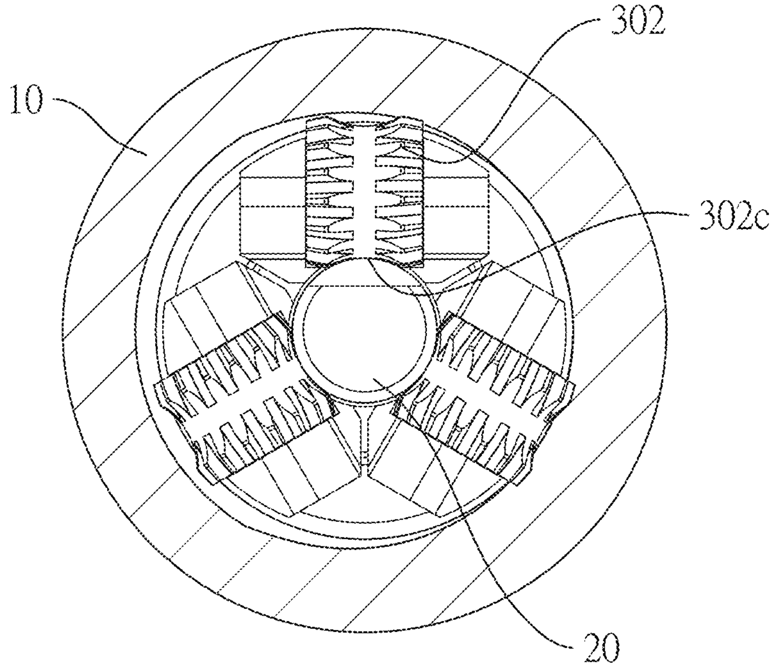
FIG. 3B is a sectional view taken along line A-A of FIG. 2B.

Please refer to FIGS. 1B, 2B, 3A, and 3B. As shown in FIGS. 1B, 3A, and 3B, each of the preload assemblies 40 is disposed radially outward of the three worm gear assemblies 30 and is correspondingly arranged between two adjacent holders 301 to apply a preload force to each of the worm gear assemblies 30. Accordingly, the preload assemblies 40 apply a radial preload force to the holders 301, pressing the worm gears 302 toward the rod 20 to form a stable and controllable static frictional force between the worm gears 302 and the rod 20.

In this embodiment, three preload assemblies 40 are provided, and each preload assembly 40 includes a plurality of torsion plates 401 as an example for description.

As shown in FIG. 1B, each preload assembly 40 includes a plurality of torsion plates 401, each of which is substantially plate-shaped and provided with a hook portion 402. As shown in FIGS. 1B and 3A, the torsion plates 401 are stacked as units to form a plurality of torsion plate sets 401*g*. Each of the torsion plate sets 401*g* is disposed between two corresponding end portions of the two holders 301 and is engaged with radial outer sides of the two holders 301 via the hook portions 402 to apply a preload force to the holders 301.

As shown in FIGS. 3A and 3B, by the preload force applied by each torsion plate set 401*g*, each worm gear assembly 30 is subjected to a radial preload force, which is then transmitted to the worm gears 302, pressing the worm gears 302 toward the rod 20 to form stable static frictional contact between the worm gears 302 and the rod 20, ensuring that the driving force of the internal helical gear member 10 can be smoothly transmitted to the rod 20 when the internal helical gear member 10 is rotated.

In addition, by selecting torsion plates 401 with different elastic coefficients or stacking quantities, the preload force can be adjusted, thereby controlling the strength of the static frictional force between the worm gears 302 and the rod 20 to meet different driving requirements.

Furthermore, to enable more flexible and precise control of the frictional force, this embodiment can adjust the frictional force between the worm gears 302 and the rod 20 in the following ways:

First, by adjusting the interference amount of the torsion plates 401 (for example, by selecting torsion plates with different thicknesses or adjusting the compression degree during assembly), the preload force applied by the preload assemblies 40 to the worm gears 302 can be changed, thereby indirectly changing the frictional force between the worm gears 302 and the rod 20.

Second, the surface of the rod 20 can also be treated, for example, by applying coatings, changing materials, or adjusting surface roughness, to change the friction coefficient of the surface of the rod 20, thereby adjusting the static frictional force between the worm gears 302 and the rod 20.

The design of the preload assemblies 40 of the present invention is not limited to the torsion plates 401 disclosed above but may also employ other elastic members with similar functions, such as annular or other forms of elastic members. Any structure capable of applying an appropriate preload force to each of the worm gear assemblies 30 to establish a static frictional force between the worm gears 302 and the rod 20 is within the scope of feasible implementations of the present invention.

As shown in FIGS. 1A and 2B, the worm gear linear drive structure 1 further includes at least one main bearing 50, at least one bracket 60, and at least one sliding bushing 70. In this embodiment, two main bearings 50, two brackets 60, and two sliding bushings 70 are provided as an example for description.

The two main bearings 50 are respectively disposed on the inner circumferential surfaces at the two opposite ends of the internal helical gear member 10 to provide the required radial support for the rotation of the internal helical gear member 10.

The two brackets 60 are respectively disposed on the axial outer sides of the two main bearings 50. One end of each bracket 60 can be inserted into the through hole of the corresponding main bearing 50, with the outer diameter of the end of the bracket 60 matching the inner diameter of the through hole of the main bearing 50 to form a fitted positioning relationship. Each bracket 60 is provided with a through inner bore 60*h* having a stepped structure, wherein a larger diameter section is configured for assembling the sliding bushing 70, and a smaller diameter section is configured for the rod 20 to extend through.

The two sliding bushings 70 are respectively assembled in the larger diameter sections of the through inner bores 60*h* of the two brackets 60. Each sliding bushing 70 is provided with a through hole 70*h*, the inner diameter of which matches the outer diameter of the rod 20, allowing the rod 20 to extend therethrough. During operation, the sliding bushings 70 provide radial guidance and positioning to ensure the stability and coaxial accuracy of the movement of the rod 20.

As shown in FIG. 2B, when the internal helical gear member 10 is driven to rotate, the helical gear structure 100*t* formed on its inner circumferential surface is in cross-axis meshing engagement with the outer gear structure 302*t* of the worm gears 302, thereby synchronously driving the worm gears 302 to rotate. In this embodiment, the internal helical gear member can be driven by any existing rotary driving source (for example, an electric motor with a coupling, a manual driving handle, or a stator that is circumferentially arranged around the outer periphery of the internal helical gear member), enabling a practitioner to implement the worm gear linear drive structure.

The term "cross-axis meshing engagement" herein means that the gear structure 302*t* of the worm gear 302 and the helical gear structure 100*t* of the internal helical gear member 10 are in contact with each other at an inclined angle rather than being arranged in parallel, allowing the rotation of the internal helical gear member 10 to drive the worm gears 302 to rotate and push the rod 20 to generate axial linear movement. During the rotation of the worm gears 302, the rotational torque is effectively converted into thrust through the frictional contact between the worm gears 302 and the rod 20, pushing the rod 20 to move linearly along the axial direction.

As shown in FIGS. 3A and 3B, the worm gears 302 of the three worm gear assemblies 30 are circumferentially distributed around the outer circumferential surface of the rod 20 and are stably and tightly pressed against the outer circumferential surface of the rod 20 under the radial preload force applied by the preload assemblies 40.

As shown in FIG. 3B, the recessed profile 302*c* formed on the outer circumferential surface of each worm gear 302 corresponds to the outer circumferential profile of the rod 20, allowing the worm gears 302 to form a tighter and more stable frictional contact with the rod 20 during rotation through the recessed profile 302*c*.

Figure 4A:
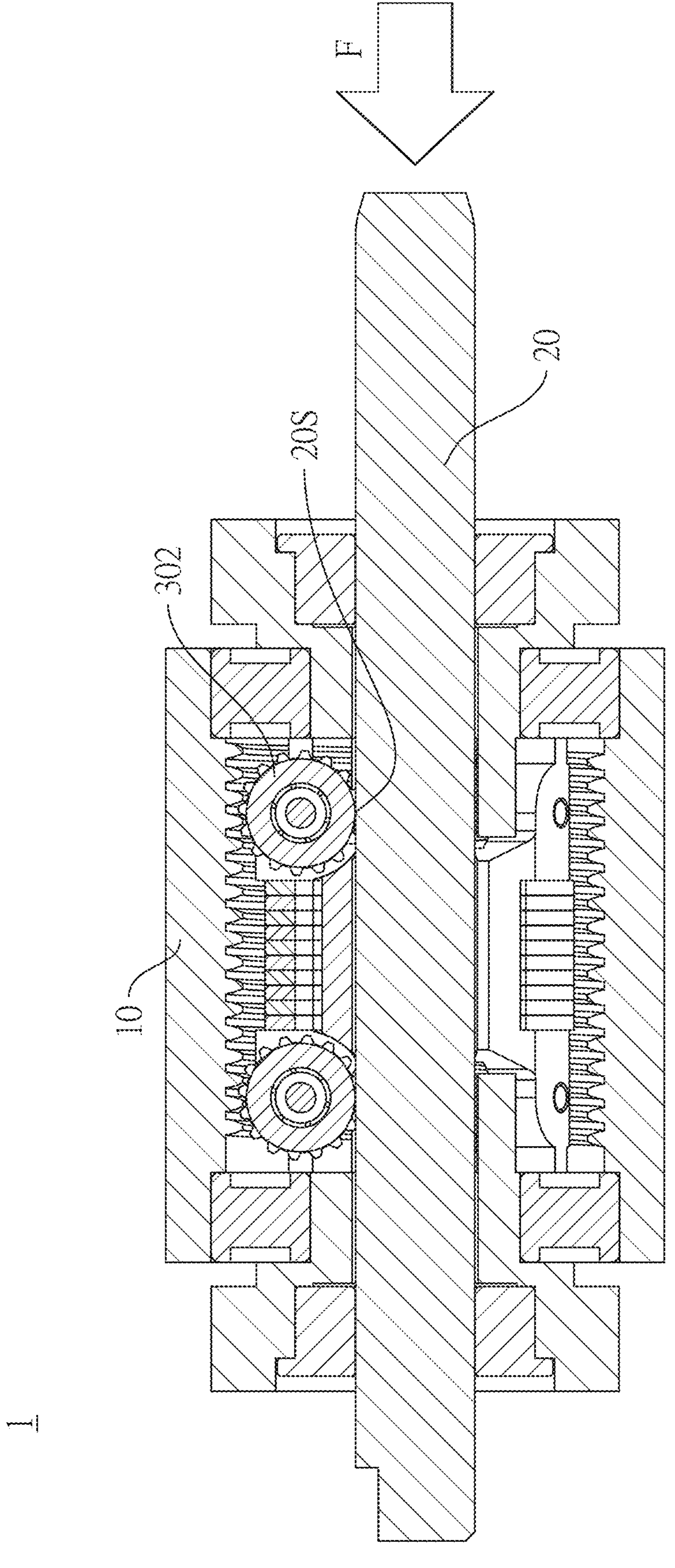
FIG. 4A is a schematic view illustrating a state where the rod of the worm gear linear drive structure is subjected to a reverse external force according to an embodiment of the present invention.
Figure 4B:
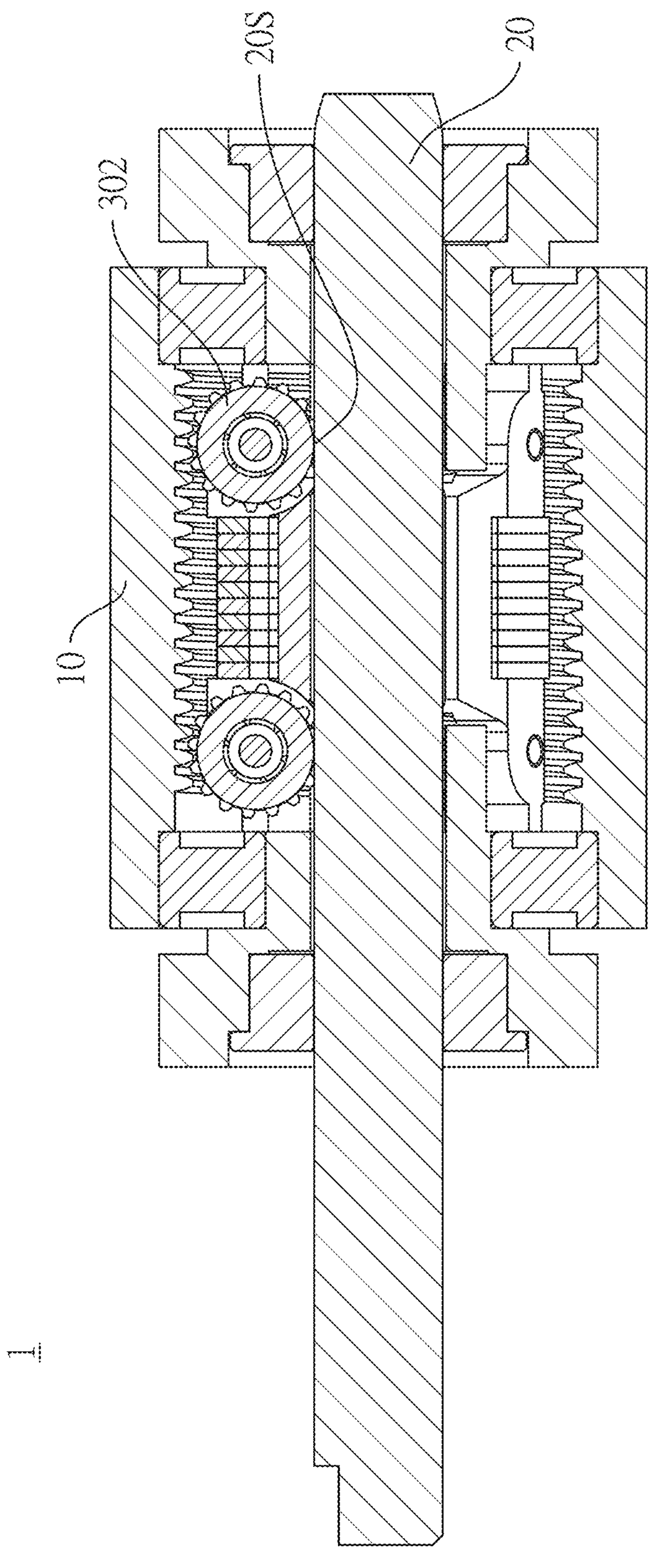
FIG. 4B is a schematic view illustrating a state where the rod of the worm gear linear drive structure slides relative to the worm gear assemblies due to friction according to an embodiment of the present invention.

Please refer to FIGS. 4A and 4B. When the rod 20 is subjected to a reverse driving force due to an external force F, if the external force F exceeds the static frictional force that can be formed by the frictional contact between the rod 20 and the worm gears 302, relative sliding (slip) will occur between the smooth surface 20*s* of the rod 20 and the worm gears 302.

In this embodiment, the worm gear linear drive structure includes the internal helical gear member, the plurality of worm gear assemblies, and the rod, with the preload assemblies applying a preload force to the worm gear assemblies to generate a static frictional force between the worm gears and the rod. When the internal helical gear member is driven to rotate, its helical gear structure and the gear structures of the worm gears are in cross-axis meshing engagement, thereby driving the worm gears to synchronously rotate. As the worm gears rotate, the recessed profiles formed on their outer circumferential surfaces form frictional contact with the outer circumferential profile of the rod, converting the rotational torque into thrust to push the rod to generate axial linear movement. Furthermore, when the rod is subjected to a reverse external force that exceeds the static frictional force formed between the worm gears and the rod, the rod will slip relative to the worm gears, thereby providing an overload protection function. This design prevents excessive reactive forces from being directly transmitted to the worm gears, the internal helical gear member, and other drive components, avoiding damage to components due to excessive loads and improving the durability and operational safety of the overall drive system.

In summary, the worm gear linear drive structure disclosed in the embodiment of the present invention utilizes a cross-axis meshing engagement design between the inner helical gear member and the worm gears, and in cooperation with the preload force provided by the preload assemblies, generates a frictional transmission mechanism between the worm gears and the rod. This enables the rotational torque to be efficiently and stably converted into linear movement of the rod, and allows the rod to automatically slip when subjected to abnormal loads, thereby preventing structural damage due to overload.

The foregoing provides a detailed description of the present invention; however, the embodiments described above are merely preferred examples and should not be construed as limiting the scope of implementation of the present invention. Any equivalent modifications and variations made in accordance with the scope of the patent claims should still fall within the patent protection scope of the present invention.

What is claimed is:

1. A worm gear linear drive structure comprising:

an internal helical gear member having an inner bore extending along an axial direction thereof, an inner circumferential surface of the internal helical gear member having a helical gear structure;

a rod disposed through the inner bore and extending along the axial direction;

a plurality of worm gear assemblies disposed within the inner bore and positioned between the internal helical gear member and the rod, each worm gear assembly including at least one worm gear, the worm gear having a gear structure and a non-geared section on an outer circumferential surface thereof, the gear structure being in cross-axis meshing engagement with the helical gear structure, and the non-geared section of the outer circumferential surface of each worm gear being in frictional contact with an outer circumferential surface of the rod; and a preload assembly disposed radially outward of the plurality of worm gear assemblies and configured to apply a preload force to each of the worm gear assemblies.

2. The worm gear linear drive structure of claim 1, further comprising:

a main bearing disposed on the inner circumferential surface of at least one end of the internal helical gear member;

a bracket disposed on an axial outer side of the main bearing, the bracket having a through inner bore; and a sliding bushing assembled within the inner bore of the bracket, the sliding bushing having a through hole;

wherein the rod further extends through the main bearing, the inner bore of the bracket, and the through hole of the sliding bushing.

3. The worm gear linear drive structure of claim 1, wherein at least a portion of the outer circumferential surface of the rod has a smooth surface, the smooth surface being configured to be in frictional contact with each of the worm gears.

4. The worm gear linear drive structure of claim 1, wherein the rod has a circular, elliptical, or polygonal geometric cross-section.

5. The worm gear linear drive structure of claim 1, wherein each of the worm gear assemblies further comprises:

a holder having a body and two pairs of end portions extending from two sides of the body, each of the end portions being provided with a through hole, a spacing being defined between each pair of the end portions, and each of the worm gears being disposed within the spacing;

at least one worm gear shaft disposed through the through holes of the holder and extending through a corresponding worm gear; and at least two worm gear bearings respectively disposed within an inner bore of the worm gear and sleeved on the worm gear shaft.

6. The worm gear linear drive structure of claim 1, wherein the outer circumferential surface of the worm gear is formed with a recessed profile, a shape of the recessed profile corresponding to an outer circumferential profile of the rod.

7. The worm gear linear drive structure of claim 1, wherein the preload assembly comprises a plurality of torsion plates, each of the torsion plates being provided with a hook portion.

8. The worm gear linear drive structure of claim 7, wherein the plurality of torsion plates are stacked to form a torsion plate set, each of the torsion plate sets being disposed between two adjacent holders and engaging radial outer sides of the two holders via the hook portions to apply a preload force to the two holders.

* * * * *